US012627889B2

(12) United States Patent
Timonen et al.

(10) Patent No.: US 12,627,889 B2
(45) Date of Patent: May 12, 2026

(54) METHOD AND DISPLAY APPARATUS INCORPORATING GAZE-BASED MOTION BLUR COMPENSATION

(71) Applicant: Varjo Technologies Oy, Helsinki (FI)

(72) Inventors: Ville Timonen, Helsinki (FI); Kalle Karhu, Espoo (FI)

(73) Assignee: Varjo Technologies Oy, Helsinki (FI)

( * ) Notice: Subject to any disclaimer, the term of this patent is extended or adjusted under 35 U.S.C. 154(b) by 107 days.

(21) Appl. No.: 18/400,036

(22) Filed: Dec. 29, 2023

(65) Prior Publication Data

US 2025/0220307 A1      Jul. 3, 2025

(51) Int. Cl.
| | |
|---|---|
| *H04N 23/68* | (2023.01) |
| *G02B 27/00* | (2006.01) |
| *G06T 5/73* | (2024.01) |

(52) U.S. Cl.
CPC ....... *H04N 23/687* (2023.01); *G02B 27/0093* (2013.01); *G06T 5/73* (2024.01); *G06T 2207/20201* (2013.01)

(58) Field of Classification Search
CPC .... H04N 23/687; G02B 27/0093; G06T 5/73; G06T 2207/20201
USPC ....................................................... 348/208.4
See application file for complete search history.

(56) References Cited

U.S. PATENT DOCUMENTS

| | | | | | |
|---|---|---|---|---|---|
| 2004/0212712 | A1* | 10/2004 | Stavely | .................. | A61B 3/113 |
| | | | | | 348/333.03 |
| 2012/0120264 | A1* | 5/2012 | Lee | ........................... | G06T 7/20 |
| | | | | | 348/208.4 |

| | | | | | |
|---|---|---|---|---|---|
| 2015/0242680 | A1* | 8/2015 | Thukral | ................. | G06V 40/19 |
| | | | | | 348/78 |
| 2017/0041545 | A1* | 2/2017 | Murgia | .............. | H04N 23/6812 |
| 2018/0157909 | A1* | 6/2018 | Ollila | ..................... | G06V 40/19 |
| 2020/0348515 | A1* | 11/2020 | Peuhkurinen | ...... | G02B 27/0172 |
| 2022/0180493 | A1* | 6/2022 | Woodall | .............. | H04N 23/681 |
| 2022/0366873 | A1* | 11/2022 | Goettker | ................. | G09G 5/00 |
| 2022/0377239 | A1* | 11/2022 | Ding | .................... | H04N 23/684 |
| 2023/0042920 | A1* | 2/2023 | Osman | ................... | A63F 13/211 |
| 2024/0100947 | A1* | 3/2024 | Amodeo | ................... | B60R 1/00 |
| 2024/0187736 | A1* | 6/2024 | Li | ......................... | H04N 23/683 |

FOREIGN PATENT DOCUMENTS

| | | |
|---|---|---|
| EP | 4280615 A1 | 11/2023 |
| WO | 2022245648 A1 | 11/2022 |

OTHER PUBLICATIONS

European Patent Office, Extended European Search Report, Application No. 24217070.2, Mailed Apr. 28, 2025, 10 pages.

* cited by examiner

*Primary Examiner* — Usman A Khan
(74) *Attorney, Agent, or Firm* — Ziegler IP Law Group, LLC.

(57) ABSTRACT

Disclosed is a method that includes detecting a beginning of a movement of a user's gaze by processing gaze-tracking data, collected by a gaze-tracking means; predicting a motion blur in an image which is to be captured by at least one camera during the movement of the user's gaze, using a portion of the gaze-tracking data that corresponds to the beginning of the movement of the user's gaze; and compensating for the predicted motion blur while capturing the image by controlling the at least one camera.

15 Claims, 4 Drawing Sheets

METHOD AND DISPLAY APPARATUS INCORPORATING GAZE-BASED MOTION BLUR COMPENSATION

TECHNICAL FIELD

The present disclosure relates to methods incorporating gaze-based motion blur compensation. Moreover, the present disclosure also relates to display apparatuses incorporating gaze-based motion blur compensation.

BACKGROUND

Nowadays, mixed-reality (MR) devices are increasingly being used for entertainment, training and simulation, engineering, healthcare, and the like. Such MR devices present interactive MR environments to users, and the users often interact in such MR environments by moving their gaze to look at different objects, following moving objects, moving their heads to change their viewing perspectives, selecting objects, manipulating objects, and the like. For enabling presentation of the MR environments, cameras arranged on the MR devices typically capture gaze-contingent images of a real-world environment in which the MR devices are being used. However, images captured during a movement of a user's gaze (and additionally, of a user's head) are quite blurry, meaning that visual details (such as text, designs, textures, and the like) in such images, are incomprehensible. In other words, such images have presence of motion blur, which is undesirable and lowers the user's visual experience.

Presently, some techniques are being employed to minimize presence of the motion blur in such images. As an example, short exposure times are used when capturing images, but in such cases, the images become very noisy (due to reduced amounts of light being captured during the short exposure times), and noise corrupts visual features in the images. Noisy images are detrimental to the user's visual experience. As another example, the images could be post-processed by employing optical flow estimation to reduce motion blur. However, optical flows have inherent uncertainty in them and may mis-estimate motion, thereby causing insufficient motion blur reduction, or worse, may introduce even larger motion blur in the images due to overcompensation. Moreover, removing motion blur as a post-processing step involves deconvolution, but motion blur is not an invertible convolution operation. So, motion blur removal via deconvolution is approximate at best, and is not effective enough.

Therefore, in light of the foregoing discussion, there exists a need to overcome the aforementioned drawbacks.

SUMMARY

The aim of the present disclosure is to provide a method and a display apparatus to capture images while accurately and efficiently compensating for a motion blur which is likely to be introduced in said images due to movement of a user's gaze during image capturing. The aim of the present disclosure is achieved by a method and a display apparatus which incorporate gaze-tracking and estimation of motion blur prior to image capturing, for capturing blur-compensated images, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 1B illustrates a motion blur that is predicted in an image, while

DETAILED DESCRIPTION OF EMBODIMENTS

Figure 1A:
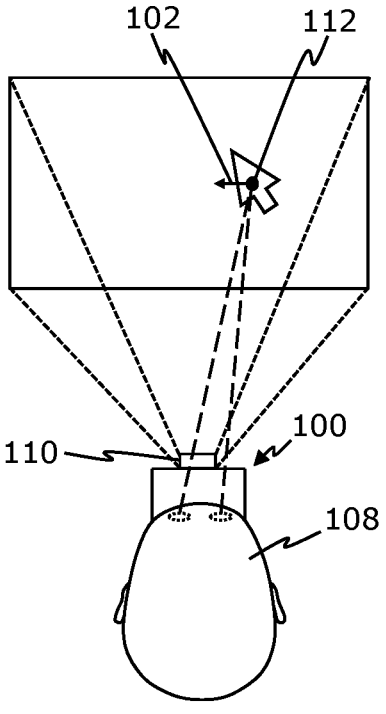
FIG. 1A is a schematic illustration of a movement of a user's gaze, when a display apparatus is in use.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method comprising:

detecting a beginning of a movement of a user's gaze by processing gaze-tracking data, collected by a gaze-tracking means;

predicting a motion blur in an image which is to be captured by at least one camera during the movement of the user's gaze, using a portion of the gaze-tracking data that corresponds to the beginning of the movement of the user's gaze; and compensating for the predicted motion blur while capturing the image by controlling the at least one camera.

In a second aspect, the present disclosure provides a display apparatus comprising:

at least one camera;

a gaze-tracking means;

at least one processor configured to:

detect a beginning of a movement of a user's gaze by processing gaze-tracking data, collected by the gaze-tracking means;

predict a motion blur in an image which is to be captured by the at least one camera during the movement of the user's gaze, using a portion of the gaze-tracking data that corresponds to the beginning of the movement of the user's gaze; and compensate for the predicted motion blur while capturing the image, by controlling the at least one camera.

The present disclosure provides the aforementioned method and the aforementioned display apparatus to capture high-quality images while accurately and efficiently compensating for a motion blur which is likely to be introduced in said images due to movement of a user's gaze during an image capturing operation, in computationally-efficient and time-efficient manner. Herein, prior to capturing the image during the movement of the user's gaze, the motion blur in said image is predicted, and is compensated accordingly while actually capturing said image using the at least one camera. In this way, the image that is captured has nil motion blur or minimal motion blur, which is imperceptible (namely, unnoticeable) to a user of the display apparatus. Beneficially, when such (blur-free, high-quality, and realistic) images may be shown to the user, a viewing experience of the user is significantly improved. Since said portion of the gaze-tracking data that corresponds to the beginning of the movement of the user's gaze is utilised for predicting the motion blur, the method and the display apparatus are susceptible for generating (blur-free) images without requiring any changes in an exposure time of the at least one camera or relying on optical flow estimations, as in case of the prior art. The method and the display apparatus are simple, robust, fast, reliable, supports real time gaze-based motion blur compensation, and can be implemented with ease.

It will be appreciated that the method enables in capturing an image that is free from motion blur or has minimal motion blur by predicting the motion blur in the image which is to be captured, and then compensating for the predicted motion blur while capturing said image. The at least one processor of the display apparatus is configured to implement the method.

Notably, the at least one processor controls an overall operation of the display apparatus. The at least one processor is communicably coupled to at least the at least one camera and the gaze-tracking means. It will be appreciated that the term "at least one processor" refers to "a single processor" in some implementations, and to "a plurality of processors" in other implementations. When the display apparatus comprises the single processor, all operations of the display apparatus can be performed by the single processor. When the display apparatus comprises the plurality of processors, different operations of the display apparatus can be performed by different (and specially configured) processors from amongst the plurality of processors. As an example, a first processor from amongst the plurality of processors may be configured to detect the beginning of the movement of the user's gaze, and a second processor from amongst the plurality of processors may be configured to predict the motion blur, and compensate for the predicted motion blur while capturing the image.

Throughout the present disclosure, the term "display apparatus" refers to specialized equipment that is capable of at least displaying images. These images may be presented to a user of the display apparatus. It will be appreciated that the term "display apparatus" encompasses a head-mounted display (HMD) device and optionally, a computing device communicably coupled to the HMD device. The term "head-mounted display" device refers to specialized equipment that is configured to present an extended-reality (XR) environment to the user when said HMD device, in operation, is worn by the user on his/her head. The HMD device is implemented, for example, as an XR headset, a pair of XR glasses, and the like, that is operable to display a visual scene of the XR environment to the user. Examples of the computing device include, but are not limited to, a laptop, a desktop, a tablet, a phablet, a personal digital assistant, a workstation, and a console. The term "extended-reality" encompasses virtual reality (VR), augmented reality (AR), mixed reality (MR), and the like. Optionally, the display apparatus further comprises at least one display, and wherein the at least one processor is configured to: process the captured image to generate an XR image; and send the XR image for displaying, to the at least one display. The at least one display could be implemented as a display or a projector. Displays and projectors are well-known in the art.

Throughout the present disclosure, the term "camera" refers to an equipment that is operable to detect and process light signals received from a real-world environment, so as to capture images of the real-world environment. Such images may, for example be, video-see-through (VST) images in case of the HMD device. Optionally, the at least one camera is implemented as a visible-light camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, the at least one camera is implemented as a combination of a visible-light camera and a depth camera. Examples of the depth camera include, but are not limited to, a Red-Green-Blue-Depth (RGB-D) camera, a ranging camera, a Light Detection and Ranging (LIDAR) camera, a Time-of-Flight (ToF) camera, a Sound Navigation and Ranging (SONAR) camera, a laser rangefinder, a stereo camera, a plenoptic camera, and an infrared (IR) camera. As an example, the at least one camera may be implemented as the stereo camera.

Throughout the present disclosure, the term "gaze-tracking means" refers to specialized equipment for detecting and/or following the user's gaze, when the display apparatus (for example, the HMD device) in operation is worn by the user. The gaze-tracking means could be implemented as contact lenses with sensors, cameras monitoring a position, a size and/or a shape of a pupil of a given eye of the user, and the like. The gaze-tracking means are well-known in the art.

Optionally, the gaze-tracking data comprises at least one of: gaze directions of user's eyes, a gaze vector indicative of at least one of: a gaze velocity, a gaze acceleration. Optionally, the at least one processor is configured to determine the at least one of: the gaze velocity, the gaze acceleration, using the gaze directions of the user's eyes. The gaze directions of the user's eyes converge at a gaze point and a change in the gaze point with respect to time is indicative of the at least one of: the gaze velocity, the gaze acceleration. Determining the gaze velocity and/or the gaze acceleration using the gaze directions is well-known in the art.

It will be appreciated that since the gaze-tracking data comprises at least the gaze directions of the user's eyes, the at least one processor could analyse the gaze directions of the user's eyes, and when a change in the gaze directions exceeds a predefined value within a given time period, it could be detected as the beginning of the movement of the user's gaze accordingly. Detection of the beginning of the movement of the user's gaze is discussed below in detail. Processing the gaze-tracking data to determine the beginning of the movement of the user's gaze is well-known in the art. It will also be appreciated that the gaze-tracking data is collected repeatedly by the gaze-tracking means throughout a given session of using the display apparatus, as the user's gaze keeps changing whilst he/she uses the display apparatus. Optionally, when processing the gaze-tracking data, the at least one processor is configured to employ at least one of: an image processing algorithm, a feature extraction algorithm, a data processing algorithm.

Optionally, processing the gaze-tracking data comprises:

determining a gaze point in a field of view of the at least one camera; and detecting a change in the gaze point and determine at least one of:

a gaze velocity, a gaze acceleration, based on the change in the gaze point;

wherein the beginning of the movement of the user's gaze is detected when at least one of the following is true:

a magnitude of the at least one of: the gaze velocity, the gaze acceleration, exceeds its corresponding predefined magnitude threshold; a direction of the at least one of: the gaze velocity, the gaze acceleration, exceeds its corresponding predefined angular threshold.

The term "gaze point" refers to a point within the field of view of the at least one camera at which the user is looking or is going to look. In an example, the gaze point may correspond to a point in a top-right portion of said field of view. Optionally, when determining the gaze point, the at least one processor is configured to map a gaze direction of a first eye of the user and a gaze direction of a second eye of the user onto the field of view of the at least one camera. This is because the gaze direction of the first eye and the gaze direction of the second eye of the user typically converge at the gaze point.

The term "gaze velocity" refers to an angular velocity with which the user's gaze is changing, whereas the term "gaze acceleration" refers to an angular acceleration with which the user's gaze is changing. Optionally, when determining the gaze velocity, the at least one processor is configured to determine a rate of change of the gaze direction of the user's eye (namely, a rate of change of gaze point) within a given time period. In this regard, the at least one processor is configured to determine an offset between two consecutive gaze points (for example, such as an initial gaze point at a first time instant and a final gaze point at a second time instant), and then divide said offset by a difference between time instants of determining the two consecutive gaze points, in order to obtain the gaze velocity in a particular direction. It is to be understood that the time instants and the offset between the two consecutive gaze points can be accurately known to the at least one processor, as it continuously determines gaze points using the gaze-tracking data. Further, optionally, when determining the gaze acceleration, the at least one processor is configured to determine a rate of change of the gaze velocity within the given time period. In this regard, the at least one processor is configured to determine a difference between two consecutive gaze velocities (for example, such as an initial gaze velocity at a first time instant and a final gaze velocity at a second time instant), and then divide said difference by a difference between time instants of determining the two consecutive gaze velocities, in order to obtain the gaze acceleration in a particular direction. The gaze velocity and the gaze acceleration are used to determine how fast the user's gaze is changing. Optionally, the given time period lies in a range of 200 milliseconds to 2000 milliseconds. It will be appreciated that since the gaze direction of the user's eye may keep on changing continuously within the given time period, the at least one processor would also determine the gaze velocity and/or the gaze acceleration continuously.

Determination of the gaze velocity and/or the gaze acceleration using the user's gaze is well-known in the art.

It will be appreciated that when the magnitude and/or the direction of the at least one of: the gaze velocity, the gaze acceleration, exceeds its corresponding predefined magnitude threshold and/or its corresponding predefined angular threshold, this means that the user's eyes have significantly moved from an initial gaze point to a next gaze point, and the beginning of the movement of the user's gaze could be detected. Optionally, in this regard, the at least one processor is configured to detect the beginning of the movement of the user's gaze when the gaze velocity exceeds a predefined velocity magnitude threshold and/or when the gaze acceleration exceeds a predefined acceleration magnitude threshold. Optionally, the predefined velocity magnitude threshold lies in a range of 50 degrees per second to 100 degrees per second. Optionally, the predefined acceleration magnitude threshold lies in a range of 500 degrees per second square to 1500 degrees per second square.

It will also be appreciated that in a case when the user gazes at a moving object, such that instead of only shifting his/her gaze according to a direction of motion of the moving object, the user moves his/her head to follow the direction of motion of the moving object, the magnitude as well as the direction of the at least one of: the gaze velocity, the gaze acceleration would change. Generally, users gaze straight (i.e., in a central part of their fields of view) and shifting their gaze sideways can be uncomfortable; so sometimes users move their heads to follow moving objects such that the moving objects are always in the central part of their fields of view (due to vestibulo-ocular reflex (VOR), which is well-known in the art). For example, when the user gazes at a virtual car that moves from left to right (from a perspective of the user), the user may rotate their head in a clockwise direction such that the virtual car is nearly always in a central portion of his/her field of view. Optionally, in this regard, the at least one processor is configured to detect the beginning of the movement of the user's gaze when the gaze velocity exceeds a predefined velocity angular threshold and/or when the gaze acceleration exceeds a predefined acceleration angular threshold. Optionally, the predefined velocity angular threshold lies in a range of 50 degrees per second to 100 degrees per second. Optionally, the predefined acceleration angular threshold lies in a range of 500 degrees per second square to 1500 degrees per second square.

Throughout the present disclosure, the term "image" refers to a visual representation of the real-world environment. The term "visual representation" encompasses colour information represented in the image, and additionally optionally other attributes associated with the image (for example, such as depth information, luminance information, transparency information (namely, alpha values), polarization information, and the like). Optionally, the colour information represented in the image is in form of at least one of: Red-Green-Blue (RGB) values, Red-Green-Blue-Alpha (RGB-A) values, Cyan-Magenta-Yellow-Black (CMYK) values, Luminance and two-colour differences (YUV) values, Red-Green-Blue-Depth (RGB-D) values, Hue-Chroma-Luminance (HCL) values, Hue-Saturation-Lightness (HSL) values, Hue-Saturation-Brightness (HSB) values, Hue-Saturation-Value (HSV) values, Hue-Saturation-Intensity (HSI) values, blue-difference and red-difference chroma components (YCbCr) values.

Throughout the present disclosure, the term "motion blur" refers to a visual anomaly representing an apparent streaking (for example, in a form of blurring) of moving/stationary object(s) of the real-world environment in an image, upon capturing of the image. Movement of such object(s) can be referred to as a local motion of the object(s). The motion blur could occur when the image is captured whilst a head of the user is moving or shaking (when the at least one camera are mounted on an HMD device worn by the user) and/or whilst a given camera is moving or shaking (namely, a global motion of the given camera).

Since said portion of the gaze-tracking data may comprise a magnitude and/or a direction of at least one of: a gaze velocity, a gaze acceleration, at the beginning of the movement of the user's gaze (as discussed earlier), the at least one processor accurately knows how much and in which direction the user's gaze would shift when the user's gaze in changing, and thus could know how much and in which direction a given pixel of an image sensor (in the at least one camera) would appear to shift accordingly, to result into a motion blur. In this regard, the at least one processor may employ a predefined relationship (for example, in form of a mapping function) between an apparent change in a position of the given pixel due to the motion blur and the at least one of: the gaze velocity, the gaze acceleration. Various ways of predicting the motion blur will now be discussed hereinbelow.

According to an embodiment, the step of predicting the motion blur in the image which is to be captured by the at least one camera during the movement of the user's gaze comprises determining an amount and a direction of the motion blur, based on a shutter speed of the at least one camera and the at least one of: a gaze velocity, a gaze acceleration, at the beginning of the movement of the user's gaze.

In this regard, the at least one processor is configured to employ at least one first mathematical relation between the shutter speed and the at least one of: the gaze velocity, the gaze acceleration, in order to determine the amount (namely, a magnitude) of the motion blur. In an example, gaze-tracking means are generally calibrated in a manner that a gaze vector corresponding to each eye of the user can be accurately known. In addition to this, cameras are generally calibrated in a manner that a gaze direction of the user's eye could be mapped onto image sensor coordinates. Such a calibration is well-known in the art, and several calibration models for example, such as a pinhole camera model, a fisheye camera model, a rational camera model, an omnidirectional camera model, and the like, could be utilised for such a calibration. Thus, the at least one processor could map the at least one of: the gaze velocity, the gaze acceleration onto an apparent velocity of the image sensor coordinates velocity (for example, defined in pixels per second). Since the shutter speed (namely, an exposure time) of the at least one camera is accurately known to the at least one processor (for example, from exposure settings employed for the at least one camera), the amount of the motion blur (that is required for compensation) can be estimated using the at least one first mathematical relation as follows:

M=V*E, wherein M refers to the amount of the motion blur, V refers to the apparent velocity of the image sensor coordinates, and E refers to the shutter speed, and wherein V is related to a calibration function (G) which maps the at least one of: the gaze velocity, the gaze acceleration to the image sensor coordinates. The calibration function (G) is pre-known to the at least one processor from a calibration of the gaze-tracking means.

It will be appreciated that the direction of the motion blur could be determined using the direction of the at least one of: the gaze velocity, the gaze acceleration. It will also be appreciated that upon assuming that an entirety of an image undergoes motion in accordance with gaze tracking movement, it is imperative to acknowledge that while movement occurring outside a foveal region of the user's eyes may be inaccurate, a resultant motion blur would remain imperceptible (namely, unnoticeable) to the human eye. Generally, humans exhibit ability to track movement with their eyes, and such an approach can be effective irrespective of whether an object itself is in motion or only a camera capturing an image is moving. Moreover, when an eye of the user fails to accurately track a movement of the object, the user would be unable to perceive the object sharply. Consequently, a gaze-based motion blur compensation (as discussed later in detail) would be highly accurate and effective, as compared to prior art techniques.

According to another embodiment, the step of predicting the motion blur in the image which is to be captured by the at least one camera during the movement of the user's gaze comprises:

processing head-tracking data, collected by a head-tracking means, for determining at least one of: a head velocity, a head acceleration, at the beginning of the movement of the user's gaze; and determining an amount and a direction of a global motion blur for an entirety of the image, based on a shutter speed of the at least one camera and the at least one of: the head velocity, the head acceleration, at the beginning of the movement of the user's gaze, wherein the motion blur comprises the global motion blur.

The term "head-tracking means" refers to specialized equipment that is employed to detect and/or follow a pose of a user's head within the real-world environment. The term "pose" encompasses a position and/or an orientation. In practice, the head-tracking means is actually employed to track a pose of the HMD device; the pose of the user's head corresponds to the pose of the HMD device as the HMD device is worn by the user on his/her head. Pursuant to embodiments of the present disclosure, the head-tracking means is implemented as a true six Degrees of Freedom (6 DoF) tracking system. In other words, the head-tracking means tracks both the position and the orientation of the user's head within a three-dimensional (3D) space of the real-world environment.

The head-tracking means could be implemented as an internal component of the HMD, as a tracking system external to the HMD device, or as a combination thereof. The head-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU), a Simultaneous Localization and Mapping (SLAM)-based unit, a Global Positioning System (GPS)-based unit. As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader. As another example, the magnetism-based tracking system may be implemented as a transmitter that is capable of generating an active magnetic field in the real-world environment and at least one receiver that is capable of sensing the magnetic field, the at least one receiver being installed into the HMD device. Such head-tracking means are well-known in the art. Moreover, the head-tracking means employs either an outside-in tracking technique or an inside-out tracking technique for collecting the head-tracking data pertaining to the pose of the user's head.

The term "head velocity" refers to an angular velocity with which the pose of the user's head is changing, whereas the term "head acceleration" refers to an angular acceleration with which the pose of the user's head is changing. Optionally, when determining the head velocity, the at least one processor is configured to determine a rate of change of the pose of the user's head within a given time period. In this regard, the at least one processor is configured to determine an offset between two consecutive poses of the user's head (for example, such as an initial pose of the user's head point at a first time instant and a final pose of the user's head at a second time instant), and then divide said offset by a difference between time instants of determining the two consecutive poses, in order to obtain the head velocity in a particular direction. It is to be understood that the time instants and the offset between the two consecutive poses can be accurately known to the at least one processor, as it continuously determines poses of the user's head using the head-tracking data. Further, optionally, when determining the head acceleration, the at least one processor is configured to determine a rate of change of the head velocity within the given time period. In this regard, the at least one processor is configured to determine a difference between two consecutive head velocities (for example, such as an initial head velocity at a first time instant and a final head velocity at a second time instant), and then divide said difference by a difference between time instants of determining the two consecutive head velocities, in order to obtain the head acceleration in a particular direction. The head velocity and the head acceleration are used to determine how fast the pose of the user's head is changing. Optionally, the given time period lies in a range of 200 milliseconds to 2000 milliseconds. It will be appreciated that since the pose of the user's head may keep on changing continuously within the given time period, the at least one processor would also determine the head velocity and/or the head acceleration continuously. It is to be noted that since the at least one of: the head velocity, the head acceleration, is/are to be determined at the beginning of the movement of the user's gaze, the processor is optionally configured to process a portion of the head-tracking data that corresponds to the beginning of the movement of the user's gaze. Determination of the head velocity and/or the head acceleration is well-known in the art.

The term "global motion blur" refers to a motion blur that has occurred in an entirety of an image or in a portion of said image. The global motion blur generally occurs due to a head movement of the user (i.e., a change in the pose of the user's head). It will be appreciated that since said portion of the head-tracking data may comprise a magnitude and/or a direction of at least one of: a head velocity, a head acceleration, at the beginning of the movement of the user's gaze (as discussed hereinabove). The global motion blur can be estimated from the head-tracking data when the head movement of the user only contains rotation. The at least one processor accurately knows how much and in which direction the user's head would shift when the pose of the user's head in changing, and thus could know how much and in which direction a given pixel of the image sensor would appear to shift accordingly, to result into a motion blur. In this regard, the at least one processor is optionally configured to employ at least one second mathematical relation between the shutter speed and the at least one of: the gaze velocity, the gaze acceleration, in order to determine the amount of the global motion blur. The at least one second mathematical relation defines a relationship (for example, in form of a mapping function) between an apparent change in a position of the given pixel due to the global motion blur and the at least one of: the head velocity, the head acceleration. It will be appreciated that the at least one second mathematical relation could be similar to the at least one first mathematical relation as described earlier, except that a calibration function (G) to be used in the at least one second mathematical relation is pre-known to the at least one processor from a calibration of the head-tracking means. The direction of the global motion blur could be determined using the direction of the at least one of: the head velocity, the head acceleration. The amount and the direction of the global motion blur determined in this manner is highly accurate and reliable (as it takes into account a global movement of the user's gaze), as compared to when optical flow techniques are employed.

Optionally, the method further comprises:

receiving, from at least one depth sensor, a depth map indicative of optical depths of objects in a field of view of the at least one camera; and adjusting the at least one of: the head velocity, the head acceleration, at the beginning of the movement of the user's gaze, based on the depth map, wherein said adjustment is made prior to the step of determining the amount and the direction of the global motion blur for the entirety of the image.

When the head movement of the user contains translation, either depth or gaze information is needed to estimate the global motion blur. In this regard, depth information in the depth map is utilised for adjusting (namely, refining) the at least one of: the head velocity, the head acceleration. Beneficially, this facilitates in determining the amount and the direction of the global motion blur with an improved accuracy. The term "depth sensor" refers to a device that detects light from the real-world environment at the plurality of photo-sensitive cells (namely, a plurality of pixels) to capture a plurality of depth signals. The plurality of depth signals are electrical signals pertaining to the optical depths of the objects in the field of view of the at least one camera. Optionally, the at least one depth sensor is a part of the at least one camera. Depth sensors are well-known in the art. The term "depth map" refers to a data structure comprising information pertaining to the optical depths of the objects or their portions present in the real-world environment. The depth map could be an image comprising a plurality of pixels, wherein a pixel value of each pixel indicates an optical depth of its corresponding real point within the real-world environment.

It will be appreciated that the depth map would be indicative of placements, textures, geometries, occlusions, and the like, of the objects or their parts from a perspective of a pose of the at least one depth sensor (or the at least one camera), and when the user's head moves (namely, when the HMD device moves), a perspective of a pose of the at least one depth sensor will also change, the depth map indicative of the optical depths of the objects would indicate such a change. Therefore, by using the depth map, the at least one processor can ascertain a 3D structure of the real-world environment, i.e., spatial relationships between different 3D points in a real-world scene. This may aid in overcoming ambiguities that may arise when relying solely on two-dimensional (2D) image features for pose determination of the user's head and subsequently, determination of the head velocity and/or the head acceleration. In other words, depth-aware pose determination may leverage correspondences between 2D image features and their associated 3D points in the real-world scene. This not only improves robustness of feature matching, but also allows the at least one processor to discard outliers more effectively, leading to a more accurate pose determination. In addition to this, without depth information of the real-world environment, pose of the user's head determined using the head-tracking means may suffer from scale ambiguity. In this regard, the depth map facilitates in providing missing scale factor, which resolves scale-related uncertainties and refines the pose of the user's head determined using the head-tracking means. This subsequently improves determination of the head velocity and/or the head acceleration.

Optionally, the method further comprises determining the at least one of: the gaze velocity, the gaze acceleration, at the beginning of the movement of the user's gaze, based on an optical flow of at least one moving object that is present in a field of view of the at least one camera and that is to be captured in the image.

The optical flow of the at least one moving object describes a motion of the at least one moving object in a sequence of images, and can be determined by analyzing positions of the at least one moving object in a plurality of previously-captured images. The optical flow is represented as a vector field wherein each pixel in a preceding image of the image has a vector associated therewith, said vector indicating a speed and a direction of motion of the at least one moving object. Techniques for determining the optical flow of the at least one moving object in the sequence of images are well-known in the art. Typically, users are known to gaze at moving objects, and to follow their motion. In such a case, when the gaze point of the user's gaze is known (i.e., a pixel corresponding to the gaze point is known) to lie at a pixel representing a moving object, a corresponding vector (in the vector field) of the pixel is indicative of not just a velocity and an acceleration of the moving object, but also of the gaze velocity and the gaze acceleration. A technical effect of determining the at least one of: the gaze velocity, the gaze acceleration, based on the optical flow of the at least one moving object, is that it takes into account local movement of the user's gaze for enabling a more robust motion blur prediction, as compared to when only the head velocity and/or the head acceleration are utilized along with the shutter speed, for said prediction.

Notably, the at least one camera is controlled so that the predicted motion blur is compensated for while the image is being captured. By such controlling of the at least one camera, the image that is captured with have nil motion blur or minimal motion blur. Such active motion blur compensation during image capturing is an effective approach which minimizes introduction of motion blur in the image, and beneficially produces high-quality camera-captured images.

According to an embodiment, compensating for the predicted motion blur while capturing the image comprises:

determining a gaze delta between two preceding consecutive images that were captured by the at least one camera previously, based on the gaze-tracking data and an image capture frame rate;

controlling an image sensor of the at least one camera to capture N sub-images during an exposure time for capturing the image, wherein an offset between any two consecutive sub-images depends on N and the gaze delta; and combining the N sub-images for generating the image, wherein the image has a combined gaze-based offset with respect to its preceding image.

A technical effect of the aforesaid manner of gaze-based motion blur compensation is that it enables accurate compensation for the motion blur in a simple manner and without employing any additional hardware. By capturing the N sub-images, various representations of the real-world environment (whereat the display apparatus is present) at intermediate times during the movement of the user's gaze are beneficially recorded, thereby providing accurate motion blur compensation when the N sub-images are utilised for generating the image. As a result, the image includes nil or minimal motion blur.

The "two preceding consecutive images" are two images that are captured consecutively, preceding the capturing of the image. Throughout the present disclosure, the "gaze delta" between the two preceding consecutive images refers to an offset between gaze points in the two preceding consecutive images. The gaze delta is indicative of not just a magnitude of the movement of the user's gaze, but also a direction of such a movement. The gaze-tracking data is indicative of such gaze points, and the image capture frame rate indicates a rate at which images are captured by the at least one camera. Therefore, the gaze delta in a time period between capturing of the two preceding consecutive images (as indicated the image capture frame rate) can be accurately determined using positions of the gaze points (as indicated in the gaze-tracking data), by employing at least one mathematical formula. As a first example, the gaze points in the two preceding consecutive images may have positions given by coordinates (10, 20) and (22, 20), and the image capture frame rate may be 10 frames per second (i.e., 1 frame per 100 milliseconds). In this case, the gaze offset may be determined as 12 pixels along X-axis, per 100 milliseconds. This means that the user's gaze moved rightwards at a rate of 12 pixels per 100 milliseconds, while viewing the two preceding consecutive images.

Throughout the present disclosure, the term "sub-image" refers to an image that is used to generate another image. The N sub-images optionally collectively constitute the (single) image. For example, N may be equal to 2, 3, 4, 5, 6, 7, 8, 9, 10, . . . , and so on. The value of N may be fixed, or may be dynamically selected based on one or more of: the gaze delta, the image capture frame rate, intrinsic camera properties, extrinsic camera properties, and the like. An exposure time for capturing each sub-image is 1/Nth of the exposure time for capturing the image.

Optionally, the gaze delta comprises a first delta value along a first dimension and a second delta value along a second dimension, wherein the offset between any two consecutive sub-images comprises a first offset along the first dimension and a second offset along the second dimension, the first offset being equal to the first delta value divided by N, and the second offset being equal to the second delta value divided by N. In this regard, the offset between any two consecutive sub-images amongst the N sub-images is same. This means that the image sensor is controlled to move sampling of all pixels on the image sensor by a same amount, when capturing each sub-image. In other words, the offset for capturing a given sub-image is spatially equal for all pixels (i.e., globally) in the given sub-image, with respect to a previous sub-image of the given sub-image. The offset is achieved by physically shifting (namely, moving/tilting) the image sensor, or by changing a relative pose between the image sensor and an optics (for example, a lens) of the at least one camera, or similar. Referring to the first example, the first delta value along the X-axis (or horizontal dimension) may be 12 pixels and the second delta value along Y-axis (or vertical dimension) may be 0 pixels. So, when N=4, for example, the first offset may be 3 pixels (i.e., 12/4 pixels) and the second offset may be 0 pixels (i.e., 0/4 pixels). This means that for capturing each sub-image amongst 4 sub-images, the image sensor is controlled to move sampling of all pixels rightwards by 3 pixels.

Optionally, each sub-image from amongst the N sub-images has a different offset with respect to the preceding image of the image. This means that in the time domain, a sampling offset employed by the image sensor, is different for different sub-images. This means that an $i^{th}$ sub-image, where i=1, 2, . . . , N, the offset between the $i^{th}$ sub-image and the preceding image (which is a full frame image) of the image, is equal to i* the offset between any two consecutive sub-images (i.e., i*the first offset along the first dimension and i*the second offset along the second dimension). In this way, each sub-frame is given a unique sampling offset. Continuing the reference to the first example, a first sub-image that is captured 25 milliseconds after the preceding image, may have an offset of 3 pixels along the X-axis; a second sub-image that is captured 50 milliseconds after the preceding image may have an offset of 6 pixels along the X-axis; a third sub-image that is captured 75 milliseconds after the preceding image may have an offset of 9 pixels along the X-axis, and a fourth sub-image that is captured 100 milliseconds after the preceding image has an offset of 12 pixels along the X-axis, with respect to the preceding image of the image.

Optionally, the N sub-images are combined for generating the image in a manner that each pixel in the image has a same combination of offsets from the N sub-images, wherein this combination of offsets from the N sub-images is the combined gaze-based offset of the image. In other words, each pixel in the image is generated using its corresponding pixels from the N sub-images, wherein the corresponding pixels in different sub-images have different offsets. Notably, all pixels in the image have the same offset, which is the combined gaze-based offset. It will be appreciated that the at least one processor may employ at least one image processing algorithm to combine the N sub-images, for generating said image. Such image processing algorithms are well-known in the art. Further continuing the reference to the first example, a given pixel of the image may be generated using its 4 corresponding pixels from the 4 sub-images. In this regard, the given pixel may be generated using a first corresponding pixel (having a 3-pixels offset) from the first sub-image, a second corresponding pixel (having a 6-pixels offset) from the second sub-image, a third corresponding pixel (having a 9-pixels offset) from the third sub-image, and a fourth corresponding pixel (having a 12-pixels offset) from the fourth sub-image. The combined gaze-based offset of the given pixel (and of all other pixels in the image too) depends on the aforesaid four different pixel offsets. Optionally, the combined gaze-based offset is an average of the offsets of the N sub-images with respect to the preceding image. In this case, in the above example, the combined gaze-based offset may be 7.5 pixels. Alternatively, optionally, the combined gaze-based offset is a weighted average of the offsets of the N sub-images with respect to the preceding image. It will be appreciated that the combined gaze-based offset could be different from these optional scenarios.

According to another embodiment, compensating for the motion blur while capturing the image comprises:

determining a gaze delta between two preceding consecutive images captured by the at least one camera, based on the gaze-tracking data and an image capture frame rate; and controlling at least one actuator to change a pose of one of: the at least one camera, an image sensor of the at least one camera, or a lens of the at least one camera, during an exposure time for capturing the image, in a continuous manner such that a movement of the image on the image sensor of the at least one camera matches a direction and a magnitude of the gaze delta, wherein the image has a continuous exposure and a constant gaze-based offset with respect to its preceding image.

In this regard, the at least one actuator is controlled to physically move (namely, shift or tilt) the one of: the at least one camera, the image sensor of the at least one camera, or the lens of the at least one camera, according to the gaze delta, in order to minimize the motion blur in the image thus captured. Said movement is a compensatory movement that is implemented during the exposure time for image capturing, for counteracting the effect of the movement of the user's gaze. The image is generated using a single discrete exposure with a moving element, the moving element being one of: the at least one camera, the image sensor, the lens. Any of these elements could be moved to achieve the movement of the image on the image sensor of the at least one camera. Said movement matches the gaze delta, since said movement is intended to minimize the motion blur corresponding to the gaze delta. Optionally, the movement of the image on the image sensor of the at least one camera is opposite to the direction of the gaze delta and is equal to the magnitude of the gaze delta. As an example, when the gaze delta is directed upwards and has a magnitude of 10 pixels per 0.1 seconds, the image sensor may be accordingly tilted downwards, or moved downwards, or similar. The tilting depends on a camera pixels per degree (PPD). If the camera PPD is 10, then it should be tilted downwards by 1 degree.

Moreover, in the above regard, since each image captured by the at least one camera has a single gaze point, and a corresponding single gaze velocity, thus all pixels of the image would have a same offset with respect to corresponding pixels of the preceding image, said offset being dependent on the gaze delta. In other words, the image has a gaze-based offset which is spatially constant across a field of view of the image. A technical effect of the aforesaid manner of gaze-based motion blur compensation is that it enables accurate compensation for the motion blur in a simple manner that emulates the movement of the user's gaze, and without requiring heavy processing and memory resources. The change in pose provides a continuous physical compensation for the movement of the user's gaze, so that the image accurately represents the real-world environment throughout the exposure time, without any motion blur.

Optionally, the method further comprises controlling the at least one actuator, after capturing the image, to change the pose of the one of: the at least one camera, the image sensor, or the lens, whose pose was previously changed during the exposure time for capturing the image, back to its original pose prior to the previous change of pose.

Optionally, the method further comprises post-processing the image using at least one image de-blurring algorithm employing deconvolution. Notably, the image may not include any motion blur or may include minimal motion blur, since the method employs motion blur compensation techniques (described above). In instances where the image includes some residual motion blur after employing such motion blur compensation techniques, the image can be post-processed to remove such residual motion blur. In other words, such post-processing of the image provides a technical effect of eliminating (or further reducing) the motion blur in the image. The at least one image de-blurring algorithm employing deconvolution is used for such post-processing, since motion blur is essentially a convolution operation, and its effective compensation can be provided by the deconvolution. Image de-blurring algorithms (employing deconvolution) which can be used for such post-processing, are well known in the art.

The present disclosure also relates to the display apparatus as described above. Various embodiments and variants disclosed above, with respect to the aforementioned method, apply mutatis mutandis to the display apparatus.

Optionally, in the display apparatus, when compensating for the predicted motion blur while capturing the image, the at least one processor is configured to:

determine a gaze delta between two preceding consecutive images that were captured by the at least one camera previously, based on the gaze-tracking data and an image capture frame rate;

control an image sensor of the at least one camera to capture N sub-images during an exposure time for capturing the image, wherein an offset between any two consecutive sub-images depends on N and the gaze delta; and combine the N sub-images for generating the image, wherein the image has a combined gaze-based offset with respect to its preceding image.

Optionally, in the display apparatus, when compensating for the motion blur while capturing the image, the at least one processor is configured to:

determine a gaze delta between two preceding consecutive images captured by the at least one camera, based on the gaze-tracking data and an image capture frame rate; and control at least one actuator to change a pose of one of: the at least one camera, an image sensor of the at least one camera, or a lens of the at least one camera, during an exposure time for capturing the image, in a continuous manner such that a movement of the image on the image sensor of the at least one camera matches a direction and a magnitude of the gaze delta, wherein the image has a continuous exposure and a constant gaze-based offset with respect to its preceding image.

Optionally, in the display apparatus, when predicting the motion blur in the image which is to be captured by the at least one camera during the movement of the user's gaze, the at least one processor is configured to determine an amount and a direction of the motion blur, based on a shutter speed of the at least one camera and the at least one of: a gaze velocity, a gaze acceleration, at the beginning of the movement of the user's gaze.

Optionally, the display apparatus further comprises a head-tracking means, wherein when predicting the motion blur in the image which is to be captured by the at least one camera during the movement of the user's gaze, the at least one processor is configured to:

process head-tracking data, collected by the head-tracking means, to determine at least one of: a head velocity, a head acceleration, at the beginning of the movement of the user's gaze; and determine an amount and a direction of a global motion blur for an entirety of the image, based on a shutter speed of the at least one camera and the at least one of: the head velocity, the head acceleration, at the beginning of the movement of the user's gaze, wherein the motion blur comprises the global motion blur.

Optionally, the display apparatus further comprises at least one depth sensor, wherein the at least one processor is further configured to:

receive, from the at least one depth sensor, a depth map indicative of optical depths of objects in a field of view of the at least one camera; and adjust the at least one of: the head velocity, the head acceleration, at the beginning of the movement of the user's gaze, based on the depth map, wherein said adjustment is made prior to the step of determining the amount and the direction of the global motion blur for the entirety of the image.

Optionally, in the display apparatus, the at least one processor is further configured to post-process the image using at least one image de-blurring algorithm employing deconvolution.

Optionally, in the display apparatus, the at least one processor is further configured to determine the at least one of: the gaze velocity, the gaze acceleration, at the beginning of the movement of the user's gaze, based on an optical flow of at least one moving object that is present in a field of view of the at least one camera and that is to be captured in the image.

Optionally, in the display apparatus, when processing the gaze-tracking data, the at least one processor is further configured to:

determine a gaze point in a field of view of the at least one camera; and detect a change in the gaze point and determine at least one of: a gaze velocity, a gaze acceleration, based on the change in the gaze point; wherein the beginning of the movement of the user's gaze is detected when at least one of the following is true:

a magnitude of the at least one of: the gaze velocity, the gaze acceleration, exceeds its corresponding predefined magnitude threshold; a direction of the at least one of: the gaze velocity, the gaze acceleration, exceeds its corresponding predefined angular threshold.

DETAILED DESCRIPTION OF THE DRAWINGS

Figure 1B:
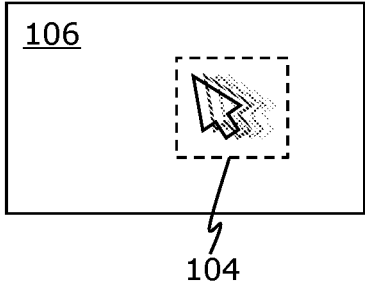
Figure 1C:
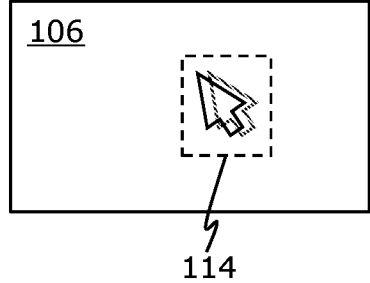
FIG. 1C illustrates the image that is captured while compensating for the predicted motion blur of FIG. 1B, in accordance with an embodiment of the present disclosure.

Referring to FIGS. 1A, 1B, and 1C, FIG. 1A is a schematic illustration of a movement 102 of a user's gaze, when a display apparatus 100 is in use, FIG. 1B illustrates a motion blur 104 that is predicted in an image 106, and FIG. 1C illustrates the image 106 that is captured while compensating for the predicted motion blur 104 of FIG. 1B, in accordance with an embodiment of the present disclosure.

As shown in FIG. 1A, the user wears the display apparatus 100 on their head 108. The display apparatus 100 comprises at least one camera (depicted as a camera 110), a gaze-tracking means (not shown), and at least one processor (not shown). The user's gaze is shown to be focused at a gaze point 112 in a field of view (depicted via square dot lines) of the at least one camera 110. The gaze point 112 is a point at which gaze directions of a user's eyes (depicted as long dashed lines) converge. A beginning of the movement 102 of the user's gaze, is detected by processing gaze-tracking data, collected by the gaze-tracking means of the display apparatus 100.

In FIG. 1B, there is shown the motion blur 104 in the image 106 which is to be captured by the at least one camera 110 during the movement 102 of the user's gaze. The motion blur 104 is predicted prior to capturing of the image 106, using a portion of the gaze-tracking data that corresponds to the beginning of the movement 102 of the user's gaze. For example, the motion blur 104 may be towards a same direction as a direction of the movement 102 of the user's gaze. It will be appreciated that the image 106 shown in FIG. 1B is only an exemplary estimation for sake of reference, since the image 106 is actually captured after the prediction of the motion blur 104.

In FIG. 1C, the image 106 which is actually captured by the at least one camera 110 is shown. Since the predicted motion blur 104 is compensated while capturing the image 106, an actual motion blur 114 in the image is nil or is negligible. For example, the actual motion blur 114 may be much less than the predicted motion blur 104, as shown, and thus may be negligible (i.e., imperceptible to the user).

FIGS. 1A-1C merely illustrate an example embodiment, which should not unduly limit the scope of the claims herein. The person skilled in the art will recognize many variations, alternatives, and modifications of embodiments of the present disclosure.

Figure 2:
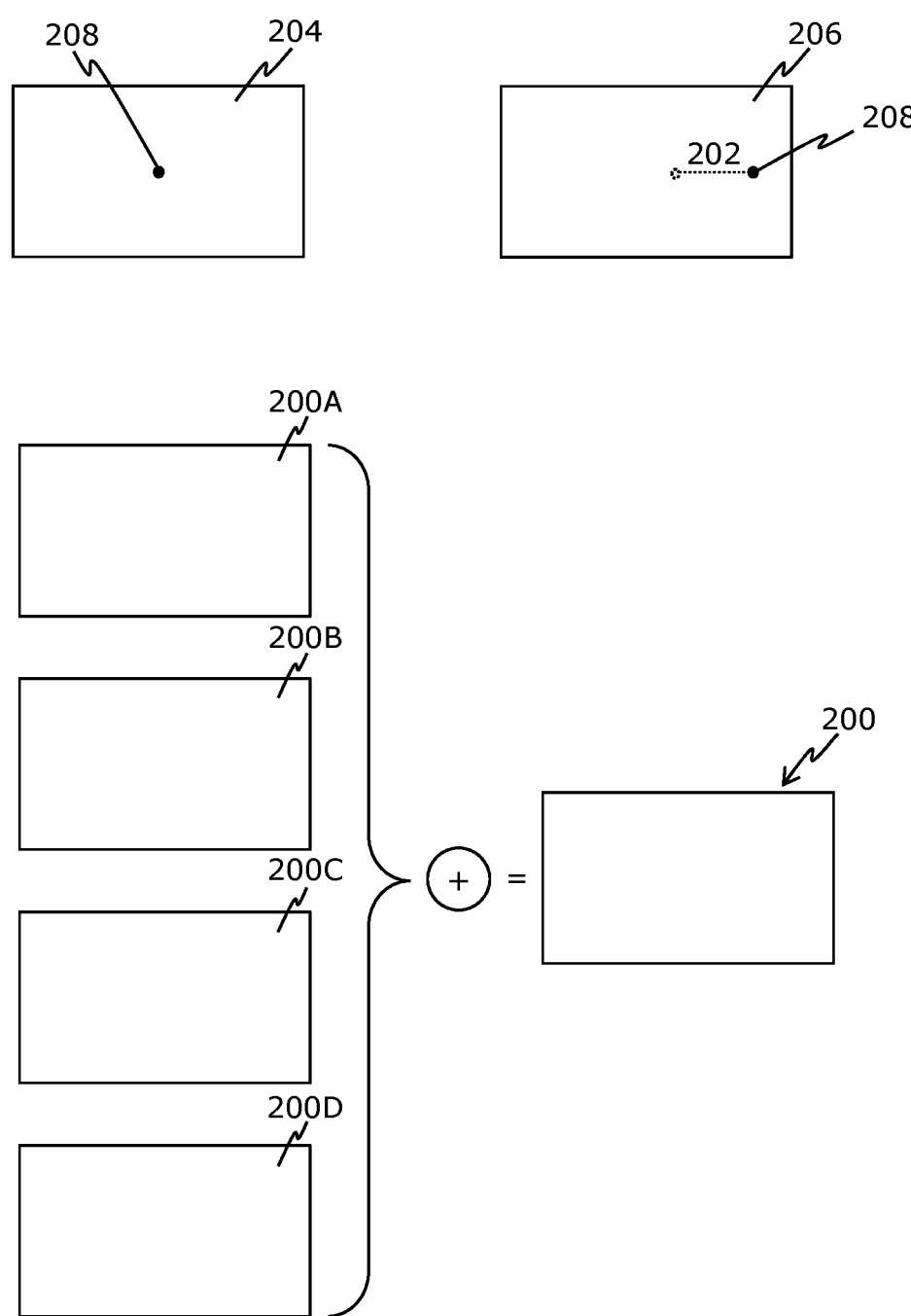
FIG. 2 illustrates an exemplary manner of compensating for a predicted motion blur when capturing an image, in accordance with an embodiment of the present disclosure.

Referring to FIG. 2, illustrated is an exemplary manner of compensating for a predicted motion blur when capturing an image 200, in accordance with an embodiment of the present disclosure. As shown, a gaze delta 202 between two preceding consecutive images 204 and 206 that were captured by at least one camera previously, is determined, based on gaze-tracking data and an image capture frame rate. The gaze delta 202 is an offset between positions of a gaze point 208 in the two preceding consecutive images 204 and 206. Said offset occurs due to a movement of a user's gaze. The image 204 precedes the image 206, and the image 200 is to be captured after the image 206.

Then, an image sensor of the at least one camera is controlled to capture N sub-images (depicted, for example, as four sub-images 200A, 200B, 200C, and 200D) during an exposure time for capturing the image 200, wherein an offset between any two consecutive sub-images depends on N and the gaze delta 202. When, for example, N=4 as shown, and the gaze delta is X pixels, an offset between any two sub-images is equal to X/4 pixels. Thus, the sub-image 200A is offset by X/4 pixels with respect to the image 206, the sub-image 200B is offset by 2*(X/4) pixels with respect to the image 206, the sub-image 200C is offset by 3*(X/4) pixels with respect to the image 206, and the sub-image 200D is offset by 4*(X/4) pixels with respect to the image 206.

Then, the four sub-images 200A, 200B, 200C, and 200D are combined (depicted, for example, as an encircled '+' sign) for generating the image 200, wherein the image 200 has a combined gaze-based offset with respect to its preceding image (i.e., the image 206).

Figure 3:
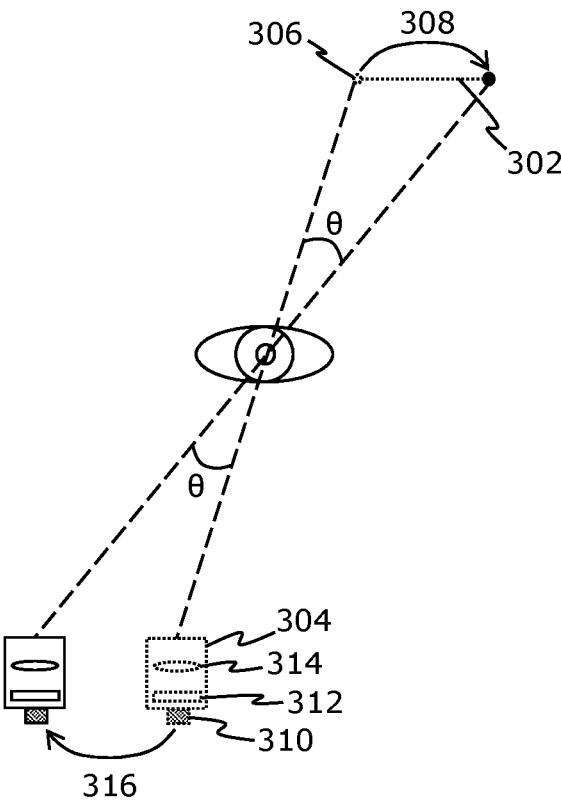
FIG. 3 illustrates another exemplary manner of compensating for a predicted motion blur when capturing an image, in accordance with a different embodiment of the present disclosure.

Referring to FIG. 3, illustrated is another exemplary manner of compensating for a predicted motion blur when capturing an image, in accordance with a different embodiment of the present disclosure. A gaze delta 302 between two preceding consecutive images captured by at least one camera (depicted as a camera 304), is determined, based on gaze-tracking data and an image capture frame rate. The gaze delta 302 is an offset between positions of a gaze point 306 in the two preceding consecutive images. Said offset occurs due to a movement 308 (depicted using a curved arrow) of a user's gaze.

Then, at least one actuator (depicted as an actuator 310) is controlled to change a pose of one of: the camera 304, an image sensor 312 of the camera 304, or a lens 314 of the camera 304, during an exposure time for capturing the image, in a continuous manner such that a movement of the image on the image sensor 312 of the camera 304 matches a direction and a magnitude of the gaze delta 302, wherein the image has a continuous exposure and a constant gaze-based offset with respect to its preceding image. For example, a movement 316 (depicted using a curved arrow) of the camera 304, corresponding to the movement 308 of the user's gaze, is shown.

FIGS. 2 and 3 are merely examples, which should not unduly limit the scope of the claims herein. The person skilled in the art will recognize many variations, alternatives, and modifications of embodiments of the present disclosure. For example, in FIG. 2, N could have different values, or the gaze delta 202 could be different, or similar variations could be feasible. For example, in FIG. 3, the actuator 310 could be controlled to change a pose of the lens 314.

Figure 4:
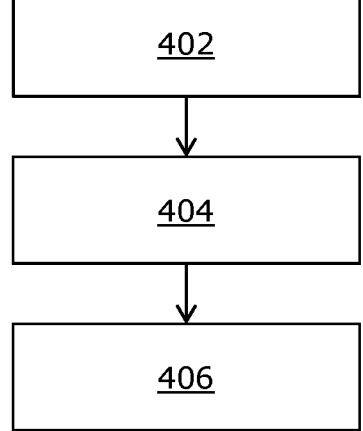
FIG. 4 illustrates steps of a method incorporating gaze-based motion blur compensation, in accordance with an embodiment of the present disclosure.

Referring to FIG. 4, illustrated are steps of a method incorporating gaze-based motion blur compensation, in accordance with an embodiment of the present disclosure. At step 402, a beginning of a movement of a user's gaze is detected, by processing gaze-tracking data that is collected by a gaze-tracking means. At step 404, a motion blur in an image which is to be captured by at least one camera during the movement of the user's gaze, is predicted, using a portion of the gaze-tracking data that corresponds to the beginning of the movement of the user's gaze. At step 406, the predicted motion blur is compensated for, while capturing the image, by controlling the at least one camera.

The aforementioned steps are only illustrative and other alternatives can also be provided where one or more steps are added, one or more steps are removed, or one or more steps are provided in a different sequence without departing from the scope of the claims.

Figure 5:
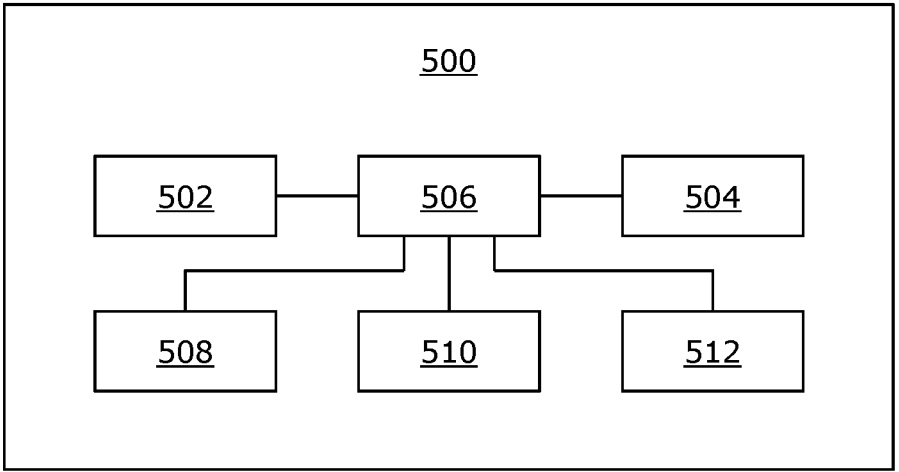
FIG. 5 illustrates a block diagram of an architecture of a display apparatus incorporating gaze-based motion blur compensation, in accordance with an embodiment of the present disclosure.

Referring to FIG. 5, illustrated is a block diagram of an architecture of a display apparatus 500 incorporating gaze-based motion blur compensation, in accordance with an embodiment of the present disclosure. The display apparatus 500 comprises at least one camera (depicted as a camera 502), a gaze-tracking means 504, and at least one processor (depicted as a processor 506). The processor 506 is communicably coupled to the camera 502 and the gaze-tracking means 504. Optionally, the display apparatus 500 further comprises a head-tracking means 508. The processor 506 is coupled to the head-tracking means 508. Optionally, the display apparatus 500 further comprises at least one depth sensor (depicted as a depth sensor 510). The processor 506 is coupled to the depth sensor 510. Optionally, the display apparatus 500 further comprises at least one display (depicted as a display 512). The processor 506 is coupled to the display 512.

It may be understood by a person skilled in the art that FIG. 5 includes a simplified architecture of the display apparatus 500, for sake of clarity, which should not unduly limit the scope of the claims herein. It is to be understood that the specific implementation of the display apparatus 500 is provided as an example and is not to be construed as limiting it to specific numbers or types of cameras, gaze-tracking means, processors head-tracking means, depth sensors, and displays. The person skilled in the art will recognize many variations, alternatives, and modifications of embodiments of the present disclosure.

The invention claimed is:
1. A method comprising:
   detecting a beginning of a movement of a user's gaze by processing gaze-tracking data, collected by a gaze-tracking means;
   predicting a motion blur in an image to be captured by at least one camera during the movement of the user's gaze, using a portion of the gaze-tracking data corresponding to the beginning of the movement of the user's gaze; and compensating for the predicted motion blur while capturing the image by controlling at least one component of the at least one camera during an exposure time for capturing the image such that motion of the image on an image sensor of the at least one camera is induced in a direction opposite to, and with a magnitude corresponding to, a gaze delta associated with a gaze point of the user.

2. The method of claim 1, wherein compensating for the predicted motion blur while capturing the image comprises:

determining a gaze delta between two preceding consecutive images that were captured by the at least one camera previously, based on the gaze-tracking data and an image capture frame rate;

controlling an image sensor of the at least one camera to capture N sub-images during an exposure time for capturing the image, wherein an offset between any two consecutive sub-images depends on N and the gaze delta; and combining the N sub-images for generating the image, wherein the image has a combined gaze-based offset with respect to its preceding image.

3. The method of claim 1, wherein compensating for the motion blur while capturing the image comprises:

determining a gaze delta between two preceding consecutive images captured by the at least one camera, based on the gaze-tracking data and an image capture frame rate; and controlling at least one actuator to change a pose of one of: the at least one camera, an image sensor of the at least one camera, or a lens of the at least one camera, during an exposure time for capturing the image, in a continuous manner such that a movement of the image on the image sensor of the at least one camera matches a direction and a magnitude of the gaze delta, wherein the image has a continuous exposure and a constant gaze-based offset with respect to its preceding image.

4. The method of claim 1, further comprising post-processing the image using at least one image de-blurring algorithm employing deconvolution.

5. The method of claim 1, wherein the step of predicting the motion blur in the image which is to be captured by the at least one camera during the movement of the user's gaze comprises determining an amount and a direction of the motion blur, based on a shutter speed of the at least one camera and at least one of: a gaze velocity, a gaze acceleration, at the beginning of the movement of the user's gaze.

6. The method of claim 1, wherein the step of predicting the motion blur in the image which is to be captured by the at least one camera during the movement of the user's gaze comprises:

processing head-tracking data, collected by a head-tracking means, for determining at least one of: a head velocity, a head acceleration, at the beginning of the movement of the user's gaze; and determining an amount and a direction of a global motion blur for an entirety of the image, based on a shutter speed of the at least one camera and the at least one of: the head velocity, the head acceleration, at the beginning of the movement of the user's gaze, wherein the motion blur comprises the global motion blur.

7. The method of claim 6, further comprising:

receiving, from at least one depth sensor, a depth map indicative of optical depths of objects in a field of view of the at least one camera; and adjusting the at least one of: the head velocity, the head acceleration, at the beginning of the movement of the user's gaze, based on the depth map, wherein said adjustment is made prior to the step of determining the amount and the direction of the global motion blur for the entirety of the image.

8. The method of claim 5, further comprising determining the at least one of: the gaze velocity, the gaze acceleration, at the beginning of the movement of the user's gaze, based on an optical flow of at least one moving object that is present in a field of view of the at least one camera and that is to be captured in the image.

9. The method of claim 1, wherein processing the gaze-tracking data comprises:

determining a gaze point in a field of view of the at least one camera; and detecting a change in the gaze point and determine at least one of: a gaze velocity, a gaze acceleration, based on the change in the gaze point;

wherein the beginning of the movement of the user's gaze is detected when at least one of the following is true:

a magnitude of the at least one of: the gaze velocity, the gaze acceleration, exceeds its corresponding predefined magnitude threshold;

a direction of the at least one of: the gaze velocity, the gaze acceleration, exceeds its corresponding predefined angular threshold.

10. A display apparatus comprising:

at least one camera;

a gaze-tracking means;

at least one processor configured to:

detect a beginning of a movement of a user's gaze by processing gaze-tracking data, collected by the gaze-tracking means;

predict a motion blur in an image to be captured by the at least one camera during the movement of the user's gaze using a portion of the gaze-tracking data corresponding to the beginning of the movement of the user's gaze; and compensate for the predicted motion blur while capturing the image by controlling at least one component of the at least one camera during an exposure time for capturing the image, such that motion of the image on an image sensor of the at least one camera is induced in a direction opposite to, and with a magnitude corresponding to, a gaze delta associated with a gaze point of the user.

11. The display apparatus of claim 10, wherein when compensating for the predicted motion blur while capturing the image, the at least one processor is configured to:

determine a gaze delta between two preceding consecutive images that were captured by the at least one camera previously, based on the gaze-tracking data and an image capture frame rate;

control an image sensor of the at least one camera to capture N sub-images during an exposure time for capturing the image, wherein an offset between any two consecutive sub-images depends on N and the gaze delta; and combine the N sub-images for generating the image, wherein the image has a combined gaze-based offset with respect to its preceding image.

12. The display apparatus of claim 10, wherein when compensating for the motion blur while capturing the image, the at least one processor is configured to:

determine a gaze delta between two preceding consecutive images captured by the at least one camera, based on the gaze-tracking data and an image capture frame rate; and control at least one actuator to change a pose of one of: the at least one camera, an image sensor of the at least one camera, or a lens of the at least one camera, during an exposure time for capturing the image, in a continuous manner such that a movement of the image on the image sensor of the at least one camera matches a direction and a magnitude of the gaze delta, wherein the image has a continuous exposure and a constant gaze-based offset with respect to its preceding image.

13. The display apparatus of claim 10, wherein when predicting the motion blur in the image which is to be captured by the at least one camera during the movement of the user's gaze, the at least one processor is configured to determine an amount and a direction of the motion blur, based on a shutter speed of the at least one camera and at least one of: a gaze velocity, a gaze acceleration, at the beginning of the movement of the user's gaze.

14. The display apparatus of claim 10, further comprising a head-tracking means, wherein when predicting the motion blur in the image which is to be captured by the at least one camera during the movement of the user's gaze, the at least one processor is configured to:

process head-tracking data, collected by the head-tracking means, to determine at least one of: a head velocity, a head acceleration, at the beginning of the movement of the user's gaze; and determine an amount and a direction of a global motion blur for an entirety of the image, based on a shutter speed of the at least one camera and the at least one of: the head velocity, the head acceleration, at the beginning of the movement of the user's gaze, wherein the motion blur comprises the global motion blur.

15. The display apparatus of claim 14, further comprising at least one depth sensor, wherein the at least one processor is further configured to:

receive, from the at least one depth sensor, a depth map indicative of optical depths of objects in a field of view of the at least one camera; and adjust the at least one of: the head velocity, the head acceleration, at the beginning of the movement of the user's gaze, based on the depth map, wherein said adjustment is made prior to the step of determining the amount and the direction of the global motion blur for the entirety of the image.

\*  \*  \*  \*  \*